United States Patent
Beseth et al.

(10) Patent No.: US 7,188,400 B1
(45) Date of Patent: Mar. 13, 2007

(54) METHOD FOR MOUNTING UNITS FOR AN AVIONIC DISPLAY

(75) Inventors: Jeffrey L. Beseth, Raymore, MO (US); Sheldon T. Wheaton, Olathe, KS (US); Walter J. Rolston, Overland Park, KS (US); Jared S. Klein, Overland Park, KS (US)

(73) Assignee: Garmin International, Inc., Olathe, KS (US)

( * ) Notice: Subject to any disclaimer, the term of this patent is extended or adjusted under 35 U.S.C. 154(b) by 158 days.

(21) Appl. No.: 10/899,477

(22) Filed: Jul. 26, 2004

Related U.S. Application Data (62) Division of application No. 10/086,483, filed on Feb. 28, 2002.

(51) Int. Cl.
*B23P 21/00* (2006.01)

(52) U.S. Cl. .......................................... 29/469; 29/428

(58) Field of Classification Search .................. 29/428, 29/897, 469, 897.2; 353/14; 340/973; 345/55; 455/431; 439/544; 361/729, 796
See application file for complete search history.

(56) References Cited

U.S. PATENT DOCUMENTS

| | | | |
|---|---|---|---|
| 3,533,045 A | 10/1970 | Henschen | |
| 3,676,747 A | 7/1972 | Jorgensen et al. | 317/101 |
| 3,859,724 A | 1/1975 | Folkenroth | |
| 4,217,764 A | 8/1980 | Armbruster | 62/323.1 |
| 4,253,225 A | 3/1981 | Wright et al. | |
| 4,313,150 A | 1/1982 | Chu | 361/755 |
| 4,385,333 A | 5/1983 | Hasler | |
| 4,493,146 A | 1/1985 | Cronin | 29/857 |
| 4,547,695 A * | 10/1985 | Rath | 313/406 |
| 4,598,336 A | 7/1986 | Hehl | |
| 4,702,712 A | 10/1987 | Ghorbani et al. | |
| 4,736,910 A | 4/1988 | O'Quinn et al. | 244/120 |
| 4,743,200 A | 5/1988 | Welch et al. | |
| 4,800,462 A | 1/1989 | Zacher et al. | |
| 4,815,984 A | 3/1989 | Sugiyama et al. | |
| 4,821,145 A | 4/1989 | Corfits et al. | 361/383 |
| 4,830,235 A | 5/1989 | Miller | |
| 4,871,134 A | 10/1989 | Oikawa | 248/65 |
| 4,996,631 A | 2/1991 | Freehauf | 361/415 |
| 5,010,642 A | 4/1991 | Takahashi et al. | |
| 5,019,947 A | 5/1991 | Pelzl | |

(Continued)

FOREIGN PATENT DOCUMENTS

| | | |
|---|---|---|
| JP | 58-121880 A | 7/1983 |
| JP | 4-4166499 A | 6/1992 |
| JP | 2001-190010 A | 10/2001 |

*Primary Examiner*—John C. Hong
(74) *Attorney, Agent, or Firm*—David L. Terrell (57) ABSTRACT

An improved device and method for mounting an avionic system is shown. The design provides varying locations of key components, which allows a single mounting system to be used with several varieties and configurations of aircraft within the crowded confines of an instrument panel. Ranges of flexibility with this system include the ability to arrange modules horizontally, and the ability to locate the display unit vertically. The multi-dimensional mounting flexibility of the mounting system shown allows electronic modules to be mounted in close proximity to a display unit, which greatly increases accessibility of the modules over prior configurations where modules were housed in the nose of the aircraft, the rear of the aircraft, or other remote locations. Installation, repair, and replacement are all greatly simplified with this configuration.

19 Claims, 7 Drawing Sheets

U.S. PATENT DOCUMENTS

| | | | |
|---|---|---|---|
| 5,091,823 A | 2/1992 | Kanbara et al. | 361/697 |
| 5,106,033 A | 4/1992 | Phan | |
| 5,211,459 A | 5/1993 | Wu | |
| 5,272,601 A | 12/1993 | McKillip | |
| 5,307,238 A * | 4/1994 | Marcus | 361/681 |
| 5,321,962 A | 6/1994 | Ferchau et al. | 70/208 |
| 5,351,176 A | 9/1994 | Smith et al. | |
| 5,388,030 A | 2/1995 | Gasser et al. | 361/618 |
| 5,414,594 A | 5/1995 | Hristake | 361/755 |
| 5,430,615 A | 7/1995 | Keeth et al. | |
| 5,438,482 A | 8/1995 | Nakamura et al. | 361/816 |
| 5,501,605 A | 3/1996 | Ozaki et al. | |
| 5,530,302 A | 6/1996 | Hamre et al. | 307/147 |
| 5,534,665 A | 7/1996 | Long | 174/72 A |
| 5,644,551 A | 7/1997 | Carmichael et al. | |
| 5,659,297 A | 8/1997 | Tatavoosian | |
| 5,737,193 A | 4/1998 | LaRiviere et al. | |
| 5,739,470 A | 4/1998 | Takeda | |
| 5,793,614 A | 8/1998 | Tollbom | 361/732 |
| 5,885,107 A | 3/1999 | Sluss et al. | |
| 5,896,273 A | 4/1999 | Varghese et al. | |
| 5,912,799 A | 6/1999 | Grouell et al. | |
| 5,946,196 A | 8/1999 | Baek | 361/798 |
| 5,947,753 A | 9/1999 | Chapman et al. | |
| 5,993,247 A | 11/1999 | Kidd | |
| 6,067,225 A | 5/2000 | Reznikov et al. | 361/685 |
| 6,102,501 A | 8/2000 | Chen et al. | |
| 6,144,549 A * | 11/2000 | Moss et al. | 361/681 |
| 6,159,030 A | 12/2000 | Gawron et al. | |
| 6,161,909 A | 12/2000 | Huang | |
| 6,246,585 B1 | 6/2001 | Gunther et al. | 361/759 |
| 6,257,897 B1 | 7/2001 | Kubota | 439/34 |
| 6,272,016 B1 | 8/2001 | Matonis et al. | |
| 6,317,334 B1 | 11/2001 | Abruzzini et al. | 361/797 |
| 6,320,744 B1 | 11/2001 | Sullivan et al. | 361/685 |
| 6,322,122 B2 * | 11/2001 | Burns et al. | 296/24.3 |
| 6,356,441 B1 * | 3/2002 | Claprood | 361/685 |
| 6,359,775 B1 * | 3/2002 | Revis | 361/683 |
| 6,373,713 B1 | 4/2002 | Jensen et al. | 361/759 |
| 6,381,130 B1 | 4/2002 | Yen | 361/685 |
| 6,381,146 B1 | 4/2002 | Sevier | 361/754 |
| 6,385,053 B1 | 5/2002 | Parizi et al. | |
| 6,422,399 B1 | 7/2002 | Castillo et al. | |
| 6,456,495 B1 | 9/2002 | Wieloch et al. | |
| 6,490,157 B2 | 12/2002 | Unrein | |
| 6,529,371 B1 | 3/2003 | Laio | |
| 6,535,397 B2 | 3/2003 | Clark et al. | |
| 6,549,424 B1 | 4/2003 | Beseth et al. | |
| 6,560,114 B2 | 5/2003 | Berry et al. | |
| 6,578,720 B1 | 6/2003 | Wang | |
| 6,592,387 B2 | 7/2003 | Komenda et al. | |
| 6,622,366 B2 * | 9/2003 | Luffel et al. | 29/434 |
| 6,654,253 B1 | 11/2003 | DiMarco | |
| 6,695,520 B1 | 2/2004 | Sarno et al. | |
| 6,771,514 B1 | 8/2004 | Elg | |
| 6,778,381 B1 | 8/2004 | Bolognia et al. | |
| 6,801,769 B1 * | 10/2004 | Royalty | 455/431 |
| 6,927,983 B1 | 8/2005 | Beseth et al. | |
| 7,008,233 B1 | 3/2006 | Ruff et al. | |
| 2002/0024802 A1 * | 2/2002 | Chikawa et al. | 361/809 |

\* cited by examiner

METHOD FOR MOUNTING UNITS FOR AN AVIONIC DISPLAY

RELATED APPLICATION

The present application is a divisional and claims priority benefits with regard to all common subject matter, of earlier-filed U.S. patent application Ser. No. 10/086,483, filed Feb. 28, 2002. The identified earlier-filed patent application is hereby incorporated into the present application by specific reference.

CROSS-REFERENCE TO RELATED APPLICATIONS

This application is related to the following co-pending, commonly assigned U.S. patent applications: "Slide-in Connector Plate for Avionic Unit Rack," Ser. No. 10/086,568; "Electronic Equipment Module Mounting Apparatus and Method," Ser. No. 10/086,482; "Retractable Panel Interface Cable Device and Method," Ser. No. 10/864,578; "Electronic Equipment Module Apparatus and Method," Ser. No. 10/086,578, each of which the disclosure is herein incorporated by reference in its entirety.

FIELD OF THE INVENTION

The invention relates to mounting devices and methods of mounting electronic equipment. Specifically, this invention relates to mounting devices and methods of mounting avionic equipment in an aircraft.

BACKGROUND OF THE INVENTION

In aviation, there is an increasing presence of computerized and electronic equipment for applications such as instrumentation and navigation. The term avionics refers generally to electronics in an aviation setting. In aviation, electronic sensors are used to monitor airspeed, electronic transmitters are used for communications, and newer applications such as use of global positioning systems (GPS) are being utilized in aircraft of all sizes.

Pricing of equipment for aircraft is competitive, and not all aircraft require the same combination of instrumentation options. To lower costs and to increase the number of end user options, more flexibility in avionic equipment is needed. In response to the need for flexibility, the electronic instrumentation industry has evolved to a largely modular system. For example, a communication system, a transponder, and a navigation system are each manufactured in a module. Modules are individually selected for an aircraft based on cost and need for a particular application. The modules are also individually replaceable, which allows aftermarket upgrades, and inexpensive replacement should a single module become damaged.

Because of limited space available on any given aircraft, designers and manufacturers have located electronic modules in areas of the aircraft where space is at less of a premium. Some currently used areas include the rear of the aircraft, or a nose compartment of the aircraft. Because the pilot or other operator is seated at a location remote from the modules, controls for the modules and displays of data from the modules must be linked to the operator through communication lines such as wires, fiber optics or the like.

While space constraints are eased by locating electronic modules in remote areas of the aircraft, these locations make installation, repair, and replacement difficult. Additionally, when the electronic modules are located remotely from the aircraft instrument panel, longer communication lines are needed to exchange data and commands with the cockpit. Longer communication lines increase the difficulty of installation and they increase the risk of line failure between the module and the cockpit.

In some aircraft, the electronic modules have been located directly in the cockpit instrument panel with a display and controls located on the front of the module, similar to a car stereo. This configuration reduces problems due to long communication lines, however it introduces a further set of limitations.

Because each module mounted on the cockpit instrument panel contains its own display screen, the space available for information display and operator command controls is forced into a modular configuration. The controls and displays tend to become cluttered and confusing when several modules are positioned near each other, each with it's own display.

Also, when mounting modules on the cockpit instrument panel, space considerations become more significant due to the additional presence of aircraft controls behind the instrument panel such as the yoke controls and ductwork housed behind the cockpit instrument panel. Space issues are also a concern in front of the instrument panel. Displays and controls for the modules must be located in a tight space below the top of the instrument panel, so as not to impair the pilot's vision. Additionally, other gauges or features on the instrument panel must be avoided when mounting a display or control unit. Fitting a group of modules, displays, and controls in a given area requires a flexibility in mounting configurations that is lacking in current designs.

What is needed is a device and method to mount avionics modules in a location that is convenient for installation and repair or replacement. What is also needed is a device and method of mounting avionics equipment that is flexible to allow more location options of displays and controls. What is also needed is a device and method of mounting avionics equipment that allows integration of displays and controls resulting in a less confusing presentation to the operator.

SUMMARY OF THE INVENTION

The above mentioned problems with installation and repair or replacement, along with the need for mounting flexibility of avionics equipment, are addressed by the present invention and will be understood by reading and studying the following specification. Systems, devices and methods are provided for mounting various configurations of avionic equipment. The systems, devices, and methods of the present invention offer a more convenient and more flexible configuration of mounting that also allows integration of displays and controls.

An avionic instrument mounting system is provided that includes a first mounting frame adapted for mounting to an avionic mounting surface. A plurality of electronic modules are coupled to the first mounting flame. In one embodiment, they are coupled to the first mounting frame by a second mounting fame located between the electronic modules and the first mounting frame, the second mounting frame being adjustable along a range of mounting locations. A display unit is located directly in front of the plurality of electronic modules and in communication with the electronic modules. The display unit is flexibly mounted, and located along a display range of mounting locations with respect to the electronic modules.

In one embodiment a front face of each electronic module includes a long axis and a short axis, and each electronic module is coupled to the second frame with the long axis oriented vertically. The electronic modules can be any number of several types of modules. One type of module may include circuitry for a global positioning system (GPS).

Another embodiment of the invention includes a first mounting frame adapted for mounting to an avionic mounting surface. A second mounting frame is mounted to the first mounting frame, the second mounting frame being adjustable along a range of mounting locations. A display unit is located directly in front of the first mounting frame. The display unit is flexibly mounted, and located along a display range of mounting locations with respect to the first mounting frame.

One embodiment of the mounting system mounts to a cockpit instrument panel although mounting to other surfaces is within the scope of the invention. Another embodiment of the invention provides a display unit that includes a flat panel display. In one embodiment, the display unit includes a liquid crystal display (LCD) unit.

Ranges of mounting locations are provided that include many ranges of flexibility in mounting. In one embodiment, the display unit is adapted for mounting in a vertical range of mounting locations with respect to an electronic module. In one embodiment, the electronic module is mountable in a horizontal range of mounting locations with respect to a mounting frame.

Among other options detailed below, the avionic instrument mounting system also includes an embodiment where a motherboard is coupled between the electronic modules and the display unit.

A method of mounting an avionic system is also described. The method includes coupling an electronic module to a mounting surface. A display unit is mounted directly in front of the electronic module along a first range of mounting locations with respect to the electronic module, and communication is established between the display unit and the electronic module.

A method of mounting along ranges of mounting locations is provided that include many ranges of flexibility in mounting. In one method, the display unit is mounted in a vertical range of mounting locations with respect to an electronic module. In one embodiment, the electronic module is mounted in a horizontal range of mounting locations with respect to a mounting frame.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENTS

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

References to directions, such as up, down, above, or below, etc. will have their normal meaning with the ground being downward when referring to embodiments not used in aircraft. When referring to embodiments mounted to an aircraft, downwards will refer to the direction towards a bottom surface of the airplane, regardless of the orientation of the airplane during flight. When referring to embodiments of the invention that are mounted adjacent to a mounting surface, such as an airplane instrument panel, references to in front of the panel will refer to a side of the panel that is operator accessible, while behind the panel will refer to the side of the panel that is normally towards the nose of the aircraft, and not easily accessible to an aircraft operator.

In one embodiment, the following device and method for mounting an avionic instrument system is used in an aircraft, and is attached to a mounting surface within the aircraft. Although this setting is used as an example, the mounting system described can be used in other settings as well without departing from the scope of the invention.

Figure 1A:
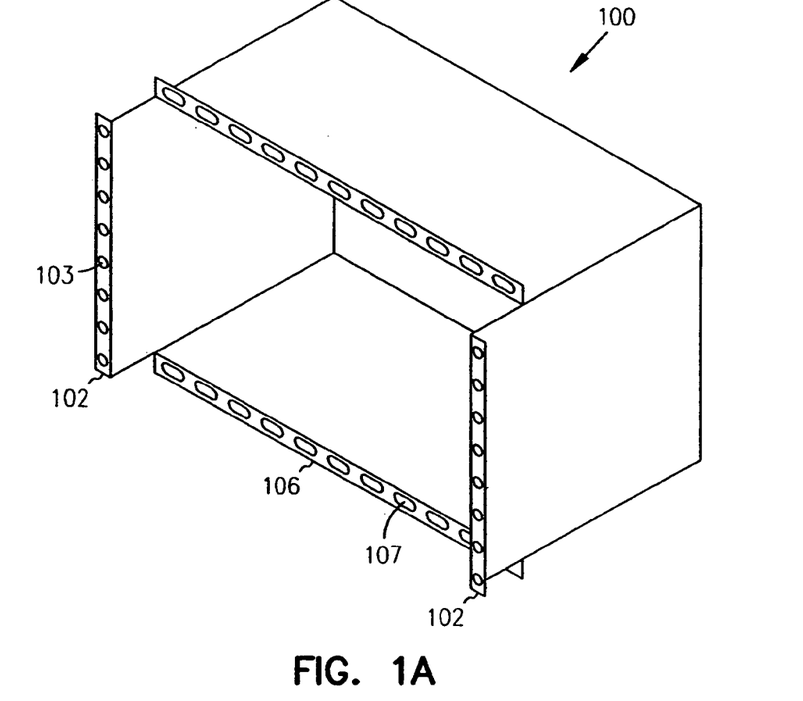
FIG. 1A shows a perspective view of an embodiment of a mounting rack according to the invention.

FIG. 1A shows a mounting frame 100. The mounting frame includes a pair of first mounting surfaces 102, each with a plurality of mounting holes 103. The mounting frame 100 also includes a pair of second mounting surfaces 106, each with a plurality of mounting slots 107. While in one embodiment, pairs of mounting surfaces are shown on opposing sides of the mounting frame 100, it is understood that other configurations of mounting surfaces are contemplated, such as one mounting surface, more than a pair of mounting surfaces, or mounting surfaces that are not on opposing sides. Likewise, the mounting holes 103 or slots 107 are only one possible configuration for attachment involving the frame 100 with the first mounting surfaces 102 and the second mounting surfaces 106. One skilled in the art will recognize that other configurations for mounting would be acceptable. The first mounting holes 103 and the second mounting slots 107 could be exchanged on their respective first mounting surfaces 102 and second mounting surfaces 106. Both surfaces 102 and 106 could use holes, or both surfaces 102 and 106 could use slots. In one configuration, the first mounting holes 103 and the second mounting slots 107 are adapted for use with a fastener such as a screw, however, alternate fasteners such as rivets, adhesives, etc. could also be used without departing from the scope of the invention.

Figure 1B:
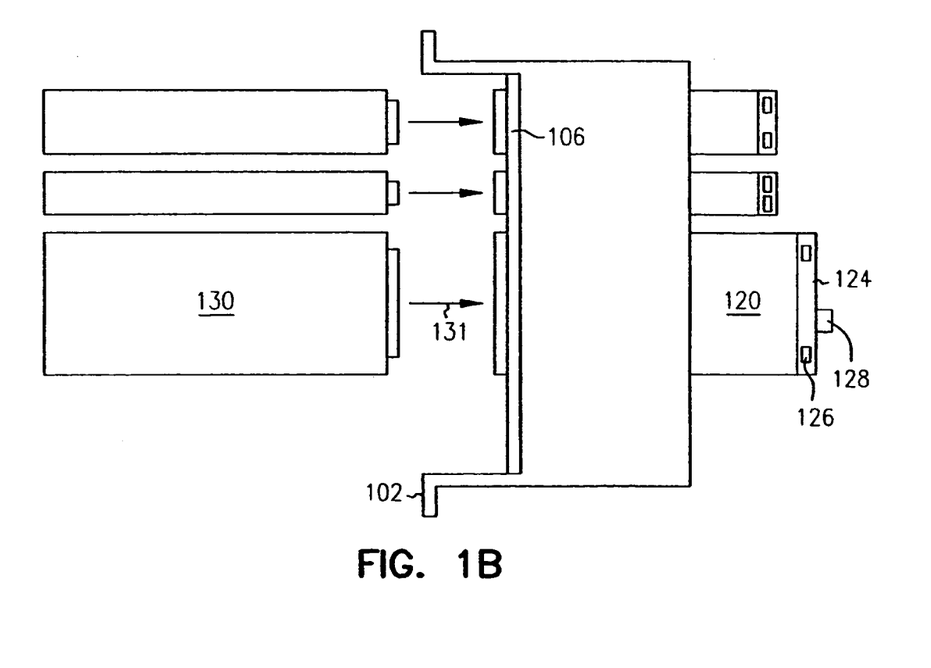
FIG. 1B shows a top view of an embodiment of a mounting system according to the invention.

FIG. 1B shows a number of unit frames 120. Each unit frame includes a back plate 124 that is secured to the unit frame 120 by a fastener 126. The back plate in one embodiment further includes an electrical connector 128 such as a pin connector. The unit frames 120 are attached to the second mounting surface 106 of the mounting frame 100. Electronic modules 130 are shown as insertable along arrow 131 into the unit frames 120. Electronic modules may include, but are not limited to examples such as a communication device, a transponder, or a global positioning system (GPS). In one embodiment, each unit frame 120 is specifically sized for a corresponding electronic module 130. Prior configurations do not offer the flexibility of both a guided slot, such as a unit frame 120 with a backplate 124, with the flexibility to tailor the size of the slot to specific electronic modules. Prior configurations offer a standard uniform size only.

Figure 1C:
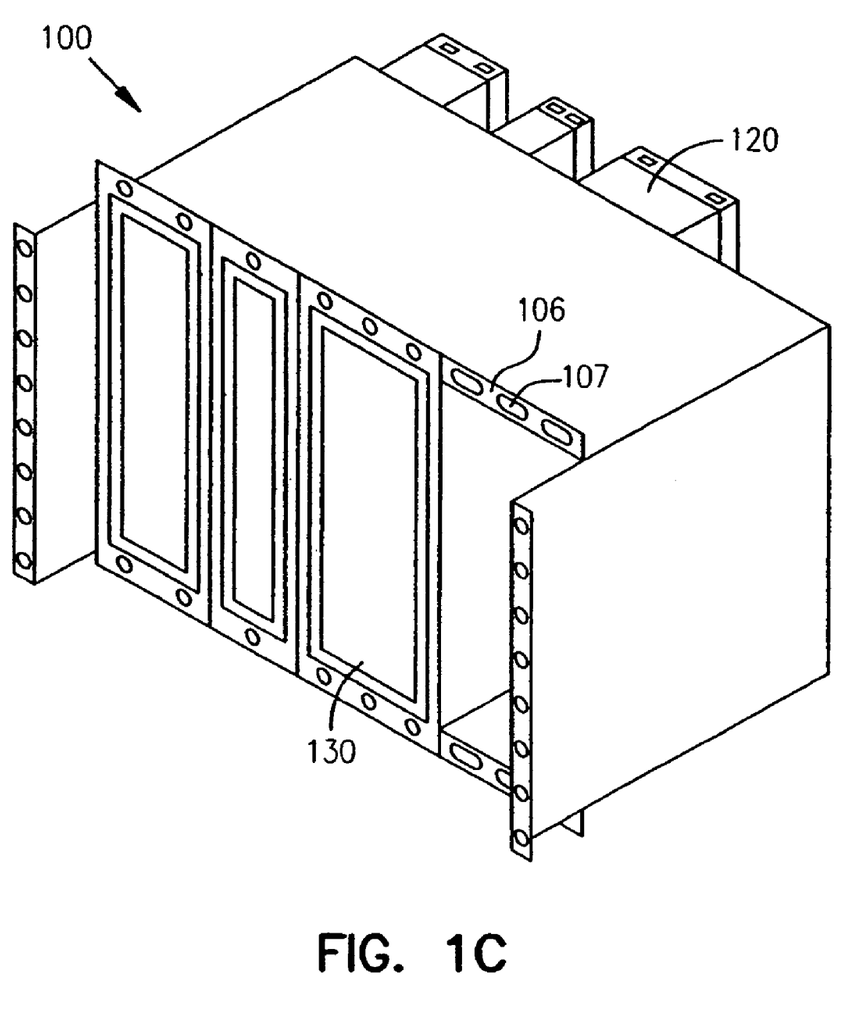
FIG. 1C shows a perspective view of an embodiment of a mounting system according to the invention.

FIG. 1C further shows the modules 130 attached to the unit frames 120. The unit frames are secured to the second mounting surface 106 through slots 107. As discussed above, other means of fastening the unit frames 120 to the mounting frame 100 are also contemplated.

Figure 1D:
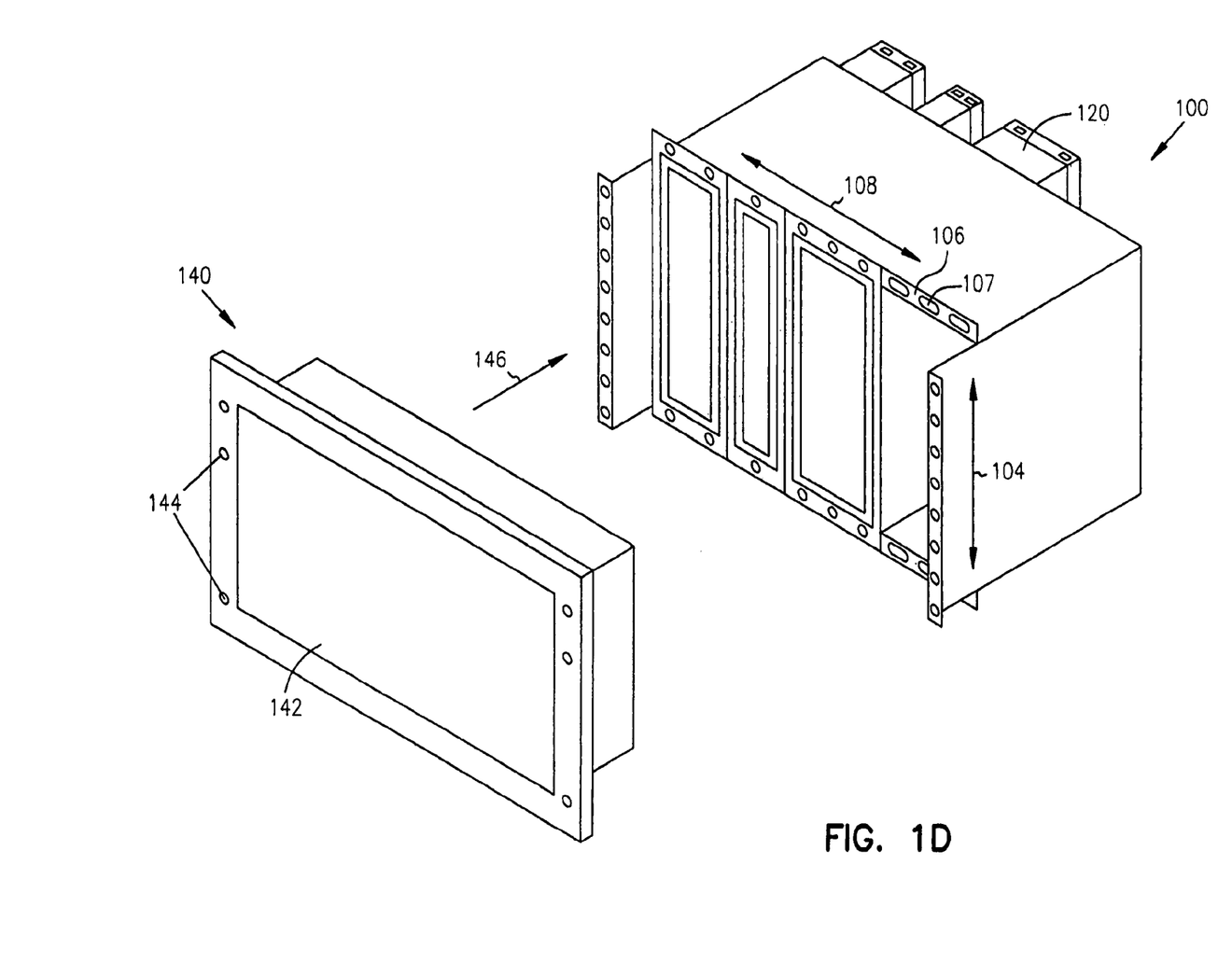
FIG. 1D shows an exploded view of an embodiment of a mounting system according to the invention.

FIG. 1D shows a display unit 140 along with the mounting frame 100, the unit frames 120 and the electronic modules 130. In one embodiment, the display unit includes a flat panel, color liquid crystal display (LCD) screen 142. Alternate display units capable of conveying data to the operator would also be acceptable. The display unit in one embodiment further includes a number of controls 144 such as knobs.

The display unit 140 is shown mounted separately from the electronic modules 130. In general, mounting of the display unit 140 is followed along arrow 146. Having the display unit mounted separately accomplishes two objectives. Separate mounting allows for more flexibility in mounting locations. One important flexibility of mounting allows the display unit 140 and the mounting frame 100 to be mounted along a first range of mounting locations 104 relative to each other. In one embodiment, the first range of mounting locations is a vertical range, however with a separate mounting configuration, any of a number of three dimensional ranges of mounting locations are possible.

In addition to mounting flexibility, having a separately mounted display unit 140 allows greater flexibility in the information displayed and greater flexibility in locations of controls 144. A single display unit 140 for a number of electronic modules 130 allows information from several modules to be displayed in a more organized, integrated manner on the single display. In contrast, prior configurations had a display attached to each electronic module, which forced each display and set of controls to be dedicated to its module. Integration of data from multiple modules on a single display was not possible in prior configurations.

FIG. 1D also shows the unit frames 120 mounted along a second range of mounting locations 108. The slots 107 of the second mounting surfaces 106 allow the unit frames to be positioned to one side or the other of the mounting frame 100. This configuration allows further mounting flexibility when mounting electronic modules 130 in a surface such as a crowded cockpit instrument panel. The use of a unit frame 120 allows a variety of sizes and shapes of electronic modules 130 to be mounted with flexibility of mount location, while maintaining ease of replacement. Unit frames 120 help guide a replacement module into place, and the unit frames can be configured with quick release mechanisms for securing the modules as well as quick electrical connections such as pin connectors.

Figure 1E:
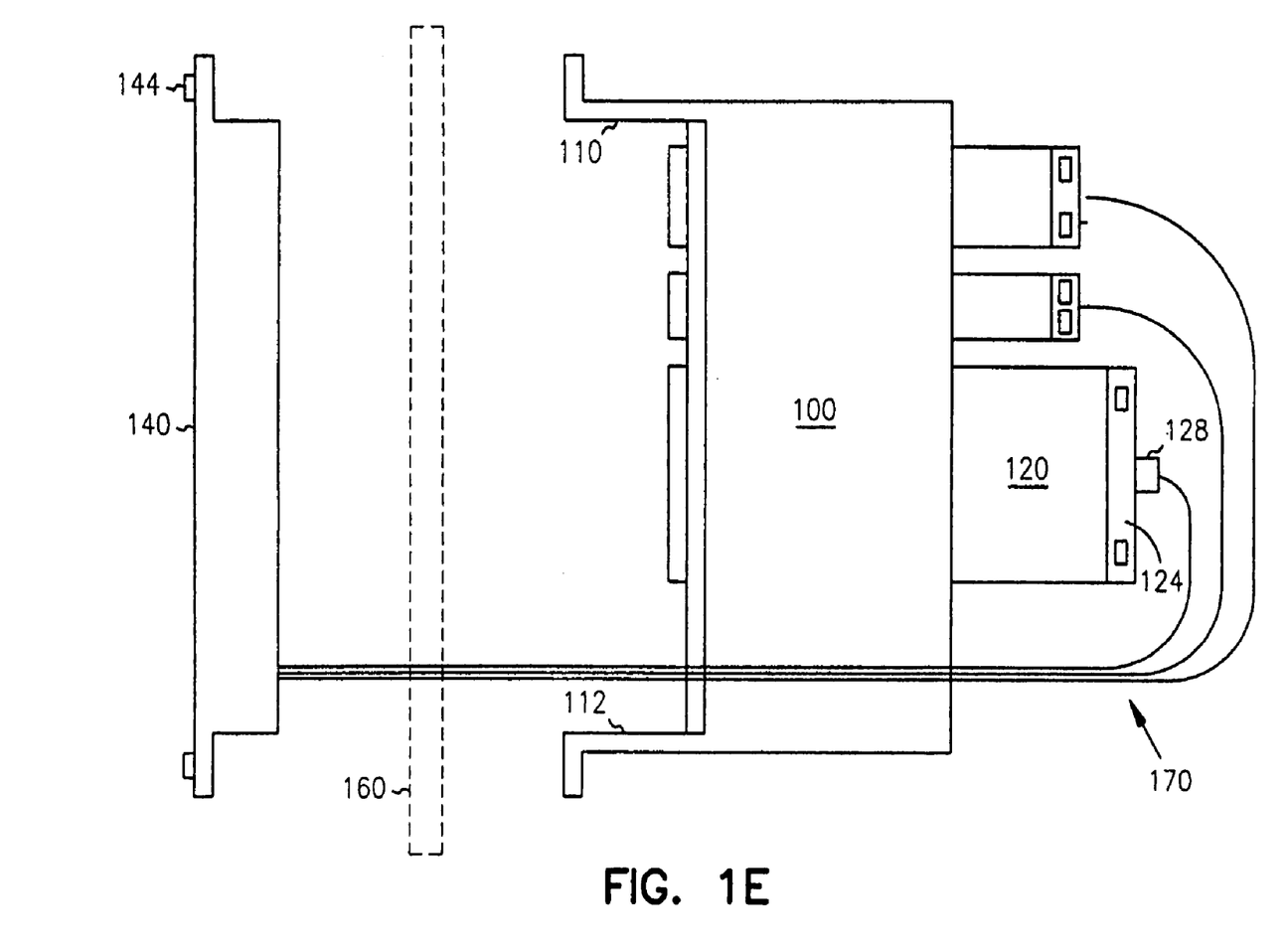
FIG. 1E shows a top view of an embodiment of a mounting system according to the invention.

FIG. 1E shows the display unit 140 in front of an instrument panel 160 and the mounting fame 100 with unit frames 120 located behind the instrument panel 160. In one configuration, the display unit nests within the mounting frame 100 along a first wall 110 and a second wall 112 of the mounting frame 100. The walls 110 and 112 allow secure mounting of the mounting frame 100 and allow a vertical range of mounting locations for the display unit 140. In a final mounted position, a portion of the display unit 140 is recessed behind the instrument panel 160, while still allowing for the vertical range of mounting locations.

FIG. 1E further shows a number of communication lines 170 connected between the display unit 140 and the number of unit frames 120. Communication lines 170 typically include electrical wires, however alternate means of communication such as fiber optic lines could also be used. In one embodiment, the communication lines attach to a connector 128 such as a pin connector. Because the display unit 140 is located in close proximity to the electronic modules 130, communication lines 170 are shorter and more reliable. Because the display unit 140 is separately mounted, the electronic modules 130 are also easily accessible for attachment of communication lines 170. The installation procedure of the mounting system is therefore greatly simplified.

Figure 1F:
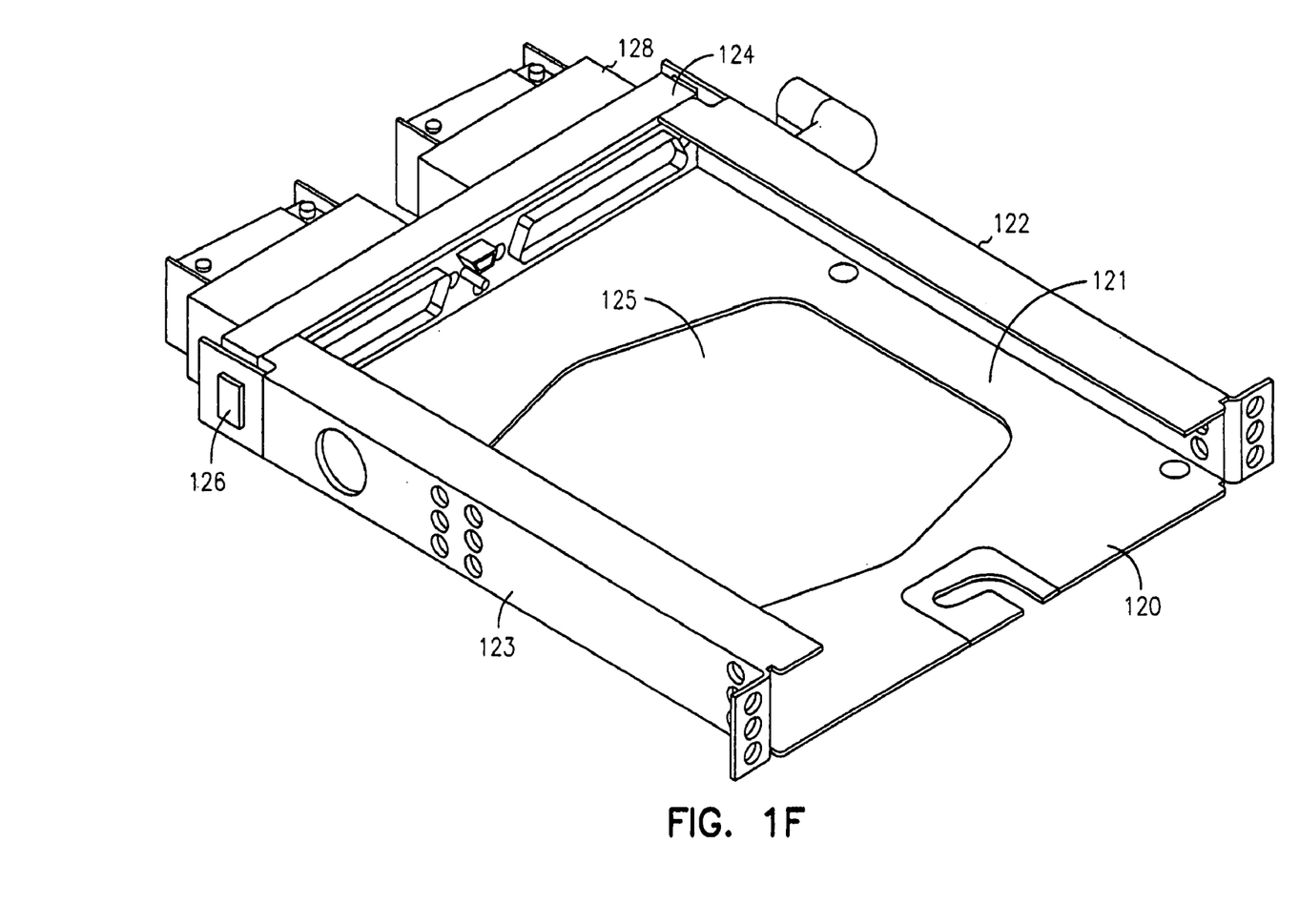
FIG. 1F shows a perspective view of a portion of one embodiment of a mounting system according to the invention.

FIG. 1F shows an embodiment of a unit frame 120. Also shown in FIG. 1F is a back plate 124 that is secured to the unit frame 120 by a fastener 126. The back plate 124 in one embodiment further includes an electrical connector 128 such as a pin connector. Due to the structural support provided by the mounting frame 100 shown in previous Figures, the unit frame 120 can be constructed with less material. In one embodiment, the unit frame 120 is not enclosed on its four main sides. The unit frame 120 shown in FIG. 1F includes a first side 121, a second side 122, and a third side 123. The first side 121 additionally includes an opening 125, which further reduces the material needed to construct the unit frame 120. One additional benefit of using less material for the unit frame 120 is an increased amount of ventilation with this configuration.

Figure 2:
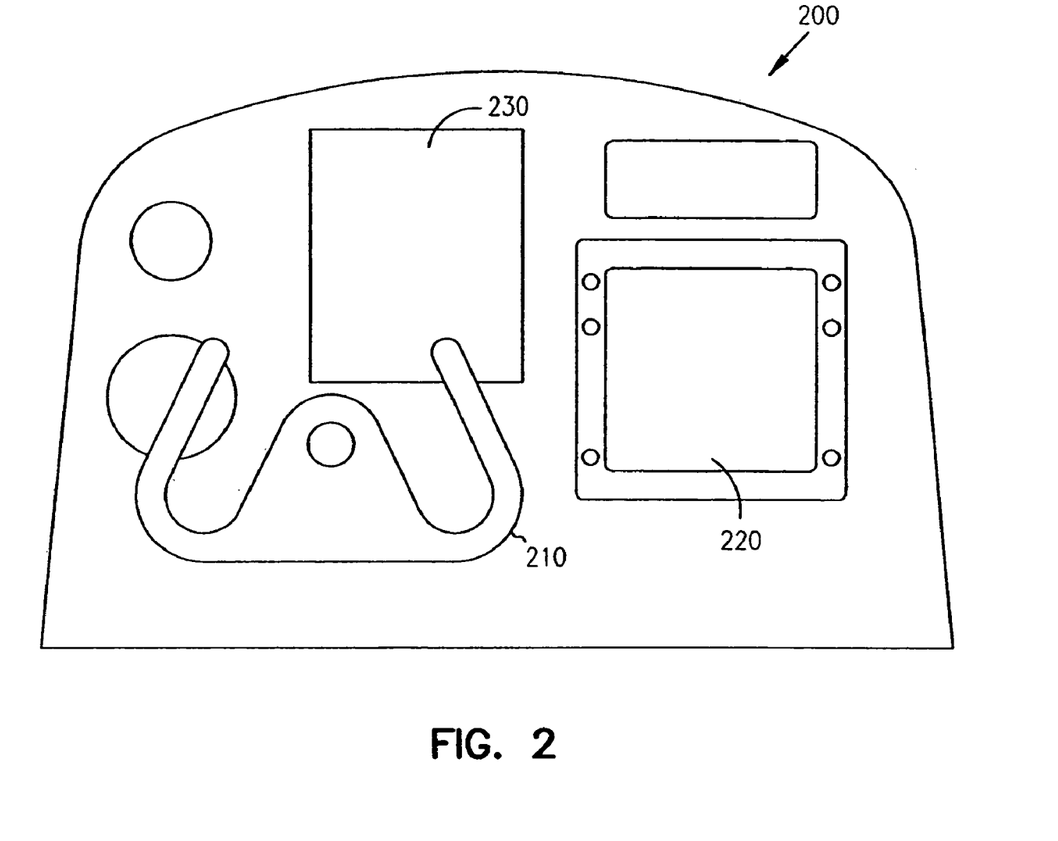
FIG. 2 shows an avionic instrument panel including an embodiment of a mounting system according to the invention.

FIG. 2 shows a common cockpit instrument panel configuration 200. The instrument panel includes a yoke 210, a display unit 220 according to the invention, and other various instrumentation 230. As can bee seen from the scale of the Figure, even small amounts of flexibility in mounting can be significant to allow displays and controls to fit on crowded areas of an instrument panel 200.

Figure 3:
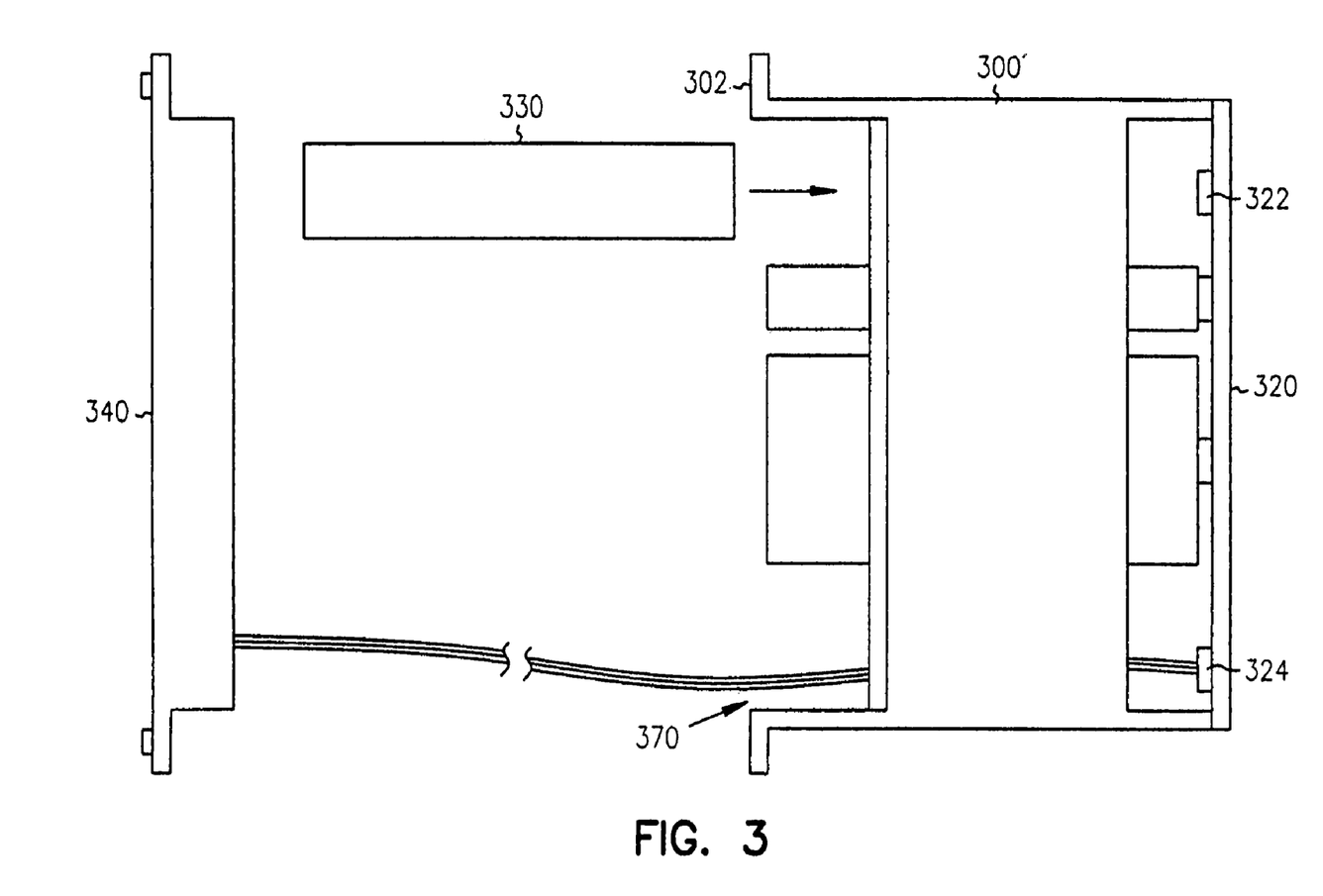
FIG. 3 shows a top view of another embodiment of a mounting system according to the invention.

FIG. 3 shows an additional embodiment of a mounting system. A mounting frame 300 is shown with a motherboard 320 attached to a back side. Electronic modules 330 are attached to board connectors 322 that are in turn attached to the motherboard 320. Communication lines 370 run from a separate interface 324 on the motherboard 320 to a display unit 340.

The use of a motherboard 320 allows for greater ease of electrically connecting communication lines 370 from the modules 330 to the display unit 340. A separate unit frame is not needed in this configuration. However, the use of a motherboard embodiment dedicates a board connector 322 to each electronic module 330, which is a tradeoff in one range of flexibility of mounting locations for the electronic modules 330. The display unit 340 in one configuration is still separately mounted from the mounting frame 300 and flexibility in mounting the display unit is available along a vertical range of mounting locations.

Returning to FIGS. 1D and 1E, a method of installing the system is described as follows. The procedure includes making an opening in a cockpit instrument panel 160 or other desired mounting surface. The mounting frame 100 would then be attached to the instrument panel 160 adjacent to the opening, typically with the majority of the mounting frame 100 being behind the instrument panel. Unit frames 120 are then installed at desired locations along the second range of mounting locations 108. Communication lines 170 are coupled to the backplates 124 of unit frames 120 before the unit frames are mounted in the mounting frame 100 in one procedure, however this step may also be performed at other points in a mounting procedure. Electronic modules are then inserted into the unit frames, the electronic modules coupling to the communication lines 170 upon insertion. After securing the electronic modules 130 in the unit frames 120, the display unit 140 is positioned along the first range of mounting locations 104 and secured in place. The display unit 140 is capable of nesting partially inside the mounting frame 100, however in alternate procedures the display unit 140 may be positioned in other configurations such as flush with the instrument panel 160.

CONCLUSION

Thus has been shown an improved device and method for mounting an avionic system. The inventive concept of allowing varying locations of key components allows a single mounting system to be used with several varieties and configurations of aircraft, within the crowded confines of the instrument panel. Ranges of flexibility with this system include the ability to arrange modules horizontally, and the ability to locate the display unit vertically. The multidimensional mounting flexibility of the mounting system shown allows electronic modules 130 to be mounted in close proximity to a display unit 140, which greatly increases accessibility of the modules 130 over prior configurations where modules 130 were housed in the nose or rear of an aircraft. Installation, repair, and replacement are all greatly simplified with this configuration.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A method of mounting an avionic instrument system to a mounting surface, comprising:
   coupling an electronic module to the mounting surface; and
   mounting a display unit having a display screen directly in front of the electronic module along a first range of mounting locations with respect to the electronic module, wherein the display screen remains usable and directly in front of the electronic module throughout the first range of mounting locations; and
   establishing communication between the display unit and the electronic module.

2. The method of claim 1, wherein establishing communication between the display unit and the electronic module includes coupling the display unit and the electronic module with a motherboard interface.

3. The method of claim 1, wherein coupling the electronic module to the mounting surface includes coupling the electronic module to a cockpit instrument panel.

4. The method of claim 1, wherein mounting the display unit directly in front of the electronic module along the first range of mounting locations includes mounting along a vertical range of mounting locations.

5. The method of claim 1, wherein a front face of the electronic module includes a long axis and a short axis, and wherein each electronic module is coupled with the long axis oriented vertically.

6. The method of claim 1, wherein the electronic module is coupled behind the mounting surface.

7. A method of assembling an avionic instrument system on a mounting surface, comprising:
   coupling a first mounting frame to the avionic mounting surface;
   positioning an electronic module adjacent to the first mounting frame along a module range of mounting locations with respect to the first mounting frame;
   coupling a second mounting frame between the electronic module and the first mounting frame;
   mounting a display unit directly in front of the electronic module along a display range of mounting locations with respect to the electronic module; and
   establishing communication between the single display unit and the electronic module.

8. The method of claim 7, wherein coupling the first mounting frame to the avionic mounting surface includes coupling the first mounting frame to a cockpit instrument panel.

9. The method of claim 7, wherein mounting the display unit include mounting a liquid crystal display (LCD) screen.

10. The method of claim 7, wherein mounting the display unit directly in front of the electronic module along the display range of mounting locations includes mounting along a vertical range of mounting locations.

11. The method of claim 7, wherein positioning an electronic module adjacent to the first mounting frame along a module range of mounting locations includes mounting along a horizontal range of mounting locations.

12. The method of claim 7, wherein a front face of the electronic module includes a long axis and a short axis, and wherein the electronic module is coupled with the long axis oriented vertically.

13. The method of claim 7, wherein the electronic module is coupled behind the avionic mounting surface.

14. A method of assembling an avionic instrument system on a mounting surface, comprising:
   coupling a first mounting frame to the avionic mounting surface;
   positioning an electronic module adjacent to the first mounting frame along a module range of mounting locations with respect to the first mounting frame;
   mounting a display unit directly in front of the electronic module along a display range of mounting locations with respect to the electronic module, wherein the module range of mounting locations is arranged substantially perpendicular to the display range of mounting locations; and establishing communication between the single display unit and the electronic module.

15. The method of claim 14, wherein coupling the first mounting frame to the avionic mounting surface includes coupling the first mounting frame to a cockpit instrument panel.

16. The method of claim 14, wherein mounting the display unit directly in front of the electronic module along the display range of mounting locations includes mounting along a vertical range of mounting locations.

17. The method of claim 14, wherein positioning an electronic module adjacent to the first mounting frame along a module range of mounting locations includes mounting along a horizontal range of mounting locations.

18. The method of claim 14, wherein a front face of the electronic module includes a long axis and a short axis, and wherein the electronic module is coupled with the long axis oriented vertically.

19. The method of claim 14, wherein the electronic module is positioned behind the avionic mounting surface.

\* \* \* \* \*